(12) United States Patent
Bennati et al.

(10) Patent No.: US 11,662,215 B2
(45) Date of Patent: May 30, 2023

(54) METHOD, APPARATUS, AND COMPUTER PROGRAM PRODUCT FOR ANONYMIZING TRAJECTORIES

(71) Applicant: HERE GLOBAL B.V., Eindhoven (NL)

(72) Inventors: Stefano Bennati, Zurich (CH); Aleksandra Kovacevic, Wettswil (CH); Gavin Brown, Berlin (DE); Ori Dov, Berlin (DE); Elena Vidyakina, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 255 days.

(21) Appl. No.: 17/088,240

(22) Filed: Nov. 3, 2020

(65) Prior Publication Data
US 2022/0136841 A1 May 5, 2022

(51) Int. Cl.
*G01C 21/34* (2006.01)
*H04W 4/02* (2018.01)

(52) U.S. Cl.
CPC .......... *G01C 21/3415* (2013.01); *H04W 4/02* (2013.01)

(58) Field of Classification Search
CPC .................................................. G01C 21/3415
USPC ........................................................ 701/411
See application file for complete search history.

(56) References Cited

U.S. PATENT DOCUMENTS

| | | | | |
|---|---|---|---|---|
| 9,727,976 B1* | 8/2017 | Perkins | ................ | G06V 20/13 |
| 9,760,718 B2* | 9/2017 | Braghin | ................ | G06F 21/60 |
| 11,151,469 B2* | 10/2021 | Agrawal | .............. | G06Q 10/107 |
| 11,282,394 B2* | 3/2022 | Elisha | .................... | G08G 1/207 |
| 11,431,682 B2* | 8/2022 | Choudhury | ........... | H04W 12/02 |
| 2013/0211700 A1* | 8/2013 | Igodt | ...................... | G01C 21/26 |
| | | | | 701/117 |
| 2014/0123304 A1* | 5/2014 | Rachlin | ................... | G06F 21/60 |
| | | | | 726/26 |
| 2014/0130178 A1* | 5/2014 | Agrawal | ............. | G06F 21/6209 |
| | | | | 726/26 |

(Continued)

FOREIGN PATENT DOCUMENTS

| | | | | |
|---|---|---|---|---|
| CN | 111837014 A | * 10/2020 | ......... | G01C 21/3492 |
| WO | WO-2012052062 A1 | * 4/2012 | ............. | G01C 21/26 |

OTHER PUBLICATIONS

Extended European Search Report for European Application No. 21206038.8 dated Mar. 22, 2022, 9 pages.

(Continued)

*Primary Examiner* — Tuan C To
(74) *Attorney, Agent, or Firm* — Alston & Bird LLP

(57) ABSTRACT

Embodiments described herein relate to anonymizing of trajectories of mobile devices through the introduction of gaps between sub-trajectories. Methods may include: receiving a set of probe data points defining a trajectory; identifying a temporal length range of sub-trajectories; receiving a mode, where the mode is established based on a preceding set of probe data points defining a trajectory, where the mode includes an indication of whether to generate a sub-trajectory or a gap from the beginning of the received set of probe data points; and establishing at least one sub-trajectory (Continued)

including a sub-set of the set of probe data points, where the at least one sub-trajectory is established to satisfy the temporal length range of sub-trajectories.

20 Claims, 12 Drawing Sheets

(56) References Cited

U.S. PATENT DOCUMENTS

| | | | | |
|---|---|---|---|---|
| 2014/0304825 | A1* | 10/2014 | Gianniotis | H04L 63/0407 726/26 |
| 2017/0011231 | A1* | 1/2017 | Aggarwal | G06F 16/2465 |
| 2017/0083708 | A1* | 3/2017 | Braghin | G06F 16/2365 |
| 2017/0091643 | A1* | 3/2017 | Agrawal | H04W 12/02 |
| 2018/0058870 | A1* | 3/2018 | Gaebler | G08G 1/093 |
| 2018/0276393 | A1 | 9/2018 | Allen et al. | |
| 2018/0302415 | A1* | 10/2018 | Chakraborty | H04W 4/025 |
| 2019/0272389 | A1 | 9/2019 | Viente et al. | |
| 2020/0124439 | A1* | 4/2020 | Fowe | G08G 1/0112 |
| 2021/0092100 | A1* | 3/2021 | Choudhury | H04L 41/5019 |
| 2021/0269057 | A1* | 9/2021 | Balu | G01C 21/3617 |

OTHER PUBLICATIONS

Romero-Tris et al., "Protecting Privacy in Trajectories with a User-Centric Approach", ACM Transactions on Knowledge Discovery from Data, vol. 12, No. 6, Article 67, (Aug. 2018), 27 pages.

Mohammed et al., "Preserving Privacy and Utility in RFID Data Publishing", Concordia Institute for Information Systems Engineering (2010), 14 pages.

Poulis et al., "Apriori-Based Algorithms for Km-Anonymizing Trajectory Data", Transactions on Data Privacy 7 (2014), pp. 165-194.

Poulis et al., "Select-Organize-Anonymize: A Framework for Trajectory Data Anonymization", 2013 IEEE 13th International Conference on Data Mining Workshops (2013), 140 pages.

Song et al., "Not So Unique in the Crowd: A Simple and Effective Algorithm for Anonymizing Location Data", CEUR Workshop Proceedings (2014), 6 pages.

Terrovitis et al., "Local Suppression and Splitting Techniques for Privacy Preserving Publication of Trajectories" IEEE Transactions on Knowledge and Data Engineering, vol. 29, No. 7 (Jul. 2017), 14 pages.

* cited by examiner

METHOD, APPARATUS, AND COMPUTER PROGRAM PRODUCT FOR ANONYMIZING TRAJECTORIES

TECHNOLOGICAL FIELD

An example embodiment of the present disclosure relates to anonymizing trajectories of mobile devices, and more particularly, to segmenting a trajectory and introducing gaps between the trajectory segments or sub-trajectories based on tailored use cases and to retain portions of the trajectory that have higher utility.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for anonymizing trajectories of mobile devices, and more particularly, to segmenting a trajectory and introducing gaps between the trajectory segments based on tailored use cases to retain portions of the trajectory that have higher utility. According to an example embodiment, an apparatus is provided including at least one processor and at least one memory including computer program code, the at least one memory and computer program code configured to, with the processor, cause the apparatus to at least: receive a set of probe data points defining a trajectory; identify a temporal length range of sub-trajectories; receive a mode, where the mode is established based on a preceding set of probe data points defining a trajectory, where the mode includes an indication of whether to generate a sub-trajectory or a gap from the beginning of the received set of probe data points; and establish at least one sub-trajectory including a sub-et of the probe data points, where the at least one sub-trajectory is established to satisfy the temporal length range of sub-trajectories.

The apparatus of some embodiments is caused to determine probe data points of the set of probe data points having a higher utility relative to other probe data points of the set of probe data points, where causing the apparatus to establish at least one sub-trajectory including a sub-set of the set of probe data points includes causing the apparatus to establish at least one sub-trajectory including a sub-set of the set of probe data points includes causing the apparatus to establish at least one sub-trajectory including the sub-set of the set of probe data points including the probe data points having a higher utility relative to the other probe data points of the set of probe data points. The apparatus of some embodiments is further caused to: identify a temporal length range of gaps between sub-trajectories; and establish at least one gap including a sub-set of the set of probe data points, where the at least one gap is established to not include the probe data points having a higher utility relative to other probe data points of the set of probe data points and to satisfy the temporal length range of gaps.

According to some embodiments, each probe data point of the set of probe data points defines a location, a timestamp, and a utility, where the utility of a probe data point is based, at least in part, on at least one of a context of the probe data point or a number of events or type of event observed at the probe data point. The mode may include an offset, where the offset identifies when a last sub-trajectory or a last gap of the preceding set of probe data points began. Causing the apparatus to establish at least one sub-trajectory including a sub-set of the set of probe data points to satisfy the temporal length range of sub-trajectories may include causing the apparatus to establish at least one sub-trajectory including a sub-set of the probe data points to satisfy the temporal length range of sub-trajectories including the offset.

According to some embodiments, causing the apparatus to establish at least one sub-trajectory including a sub-set of the set of probe data points to satisfy the temporal length range of sub-trajectories including the offset may include causing the apparatus to identify an end of the at least one sub-trajectory satisfying the temporal length range of sub-trajectories based on an optimization algorithm. The mode may include an offset, where the offset indicates a time at which a sub-trajectory ending a preceding set of probe data points began in response to the mode indicating a sub-trajectory, and where the offset indicates a time at which a gap ending a preceding set of probe data points began in response to the mode indicating a gap. The mode may include a sub-trajectory identifier of a sub-trajectory in the preceding set of probe data points defining a trajectory, where causing the apparatus to establish at least one sub-trajectory including the sub-set of the set of probe data points includes causing the apparatus to combine the sub-trajectory in the preceding set of probe data points defining a trajectory with the at least one sub-trajectory including the sub-set of the set of probe data points to form a combined sub-trajectory satisfying the temporal length range of sub-trajectories and being identified by the sub-trajectory identifier.

Embodiments provided herein include a computer program product having at least one non-transitory computer-readable storage medium having computer-executable program code portions stored therein, the computer-executable program code portions including program code instructions configured to: receive a set of probe data points defining a trajectory; identify a temporal length range of sub-trajectories; receive a mode, where the mode is established based on a preceding set of probe data points defining a trajectory, where the mode includes an indication of whether to generate a sub-trajectory or a gap from the beginning of the received set of probe data points; and establish at least one sub-trajectory including a sub-set of the set of probe data points, where the at least one sub-trajectory is established to satisfy the temporal length range of sub-trajectories.

According to some embodiments, the computer program product further includes program code instructions to: determine probe data points of the set of probe data points having a higher utility relative to other probe data points of the set of probe data points, where the program code instructions to establish at least one sub-trajectory including a sub-set of the set of probe data points includes program code instructions to establish at least one sub-trajectory including the sub-set of the set of probe data points including the probe data points having a higher utility relative to the other probe data points of the set of probe data points. Embodiments may further include program code instructions to: identify a temporal length range of gaps between sub-trajectories; and establish at least one gap including a sub-set of the set of probe data points, where the at least one gap is established to not include the probe data points having a higher utility relative to other probe data points of the set of probe data points and to satisfy the temporal length range of gaps.

According to some embodiments, each probe data point of the set of probe data points defines a location, a timestamp, and a utility, where the utility of a probe data point is based, at least in part, on at least one of a context of the probe data point or a number of events or type of event observed at the probe data point. The mode may include an offset, where the offset identifies when a last sub-trajectory or a last gap of the preceding set of probe data points began. The program code instructions to establish at least one sub-trajectory including a sub-set of the set of probe data points to satisfy the temporal length range of sub-trajectories may include program code instructions to establish at least one sub-trajectory including a sub-set of the set of probe data points to satisfy the temporal length range of sub-trajectories including the offset.

According to some embodiments, the program code instructions to establish at least one sub-trajectory including a sub-set of the set of probe data points to satisfy the temporal length range of sub-trajectories including the offset includes program code instructions to identify an end of the at least one sub-trajectory satisfying the temporal length range of sub-trajectories based on an optimization algorithm. The mode may include an offset, where the offset indicates a time at which a sub-trajectory ending a preceding set of probe data points began in response to the mode indicating a sub-trajectory, and where the offset indicates a time at which a gap ending a preceding set of probe data points began in response to the mode indicating a gap. The mode may further include a sub-trajectory identifier of a sub-trajectory in the preceding set of probe data points defining a trajectory, where the program code instructions to establish at least one sub-trajectory including the sub-set of the set of probe data points includes program code instructions to combine the sub-trajectory in the preceding set of probe data points defining a trajectory with the at least one sub-trajectory including the sub-set of the set of probe data points to form a combined sub-trajectory satisfying the temporal length range of sub-trajectories and being identified by the sub-trajectory identifier.

Embodiments provided herein include a method including: receiving a set of probe data points defining a trajectory; identifying a temporal length range of sub-trajectories; receiving a mode, where the mode is established based on a preceding set of probe data points defining a trajectory, where the mode includes an indication of whether to generate a sub-trajectory or a gap from the beginning of the received set of probe data points; and establishing at least one sub-trajectory including a sub-set of the set of probe data points, where the at least one sub-trajectory is established to satisfy the temporal length range of sub-trajectories. The mode may include an offset, where the offset indicates a time at which a sub-trajectory ending a preceding set of probe data points began in response to the mode indicating a sub-trajectory, and where the offset indicates a time at which a gap ending a preceding set of probe data points begin in response to the mode indicating a gap.

Embodiments provided herein include an apparatus including: means for receiving a set of probe data points defining a trajectory; means for identifying a temporal length range of sub-trajectories; means for receiving a mode, where the mode is established based on a preceding set of probe data points defining a trajectory, where the mode includes an indication of whether to generate a sub-trajectory or a gap from the beginning of the received set of probe data points; and means for establishing at least one sub-trajectory including a sub-set of the set of probe data points, where the at least one sub-trajectory is established to satisfy the temporal length range of sub-trajectories. The mode may include an offset, where the offset indicates a time at which a sub-trajectory ending a preceding set of probe data points began in response to the mode indicating a sub-trajectory, and where the offset indicates a time at which a gap ending a preceding set of probe data points begin in response to the mode indicating a gap.

BRIEF DESCRIPTION OF THE DRAWINGS

Figure 1:
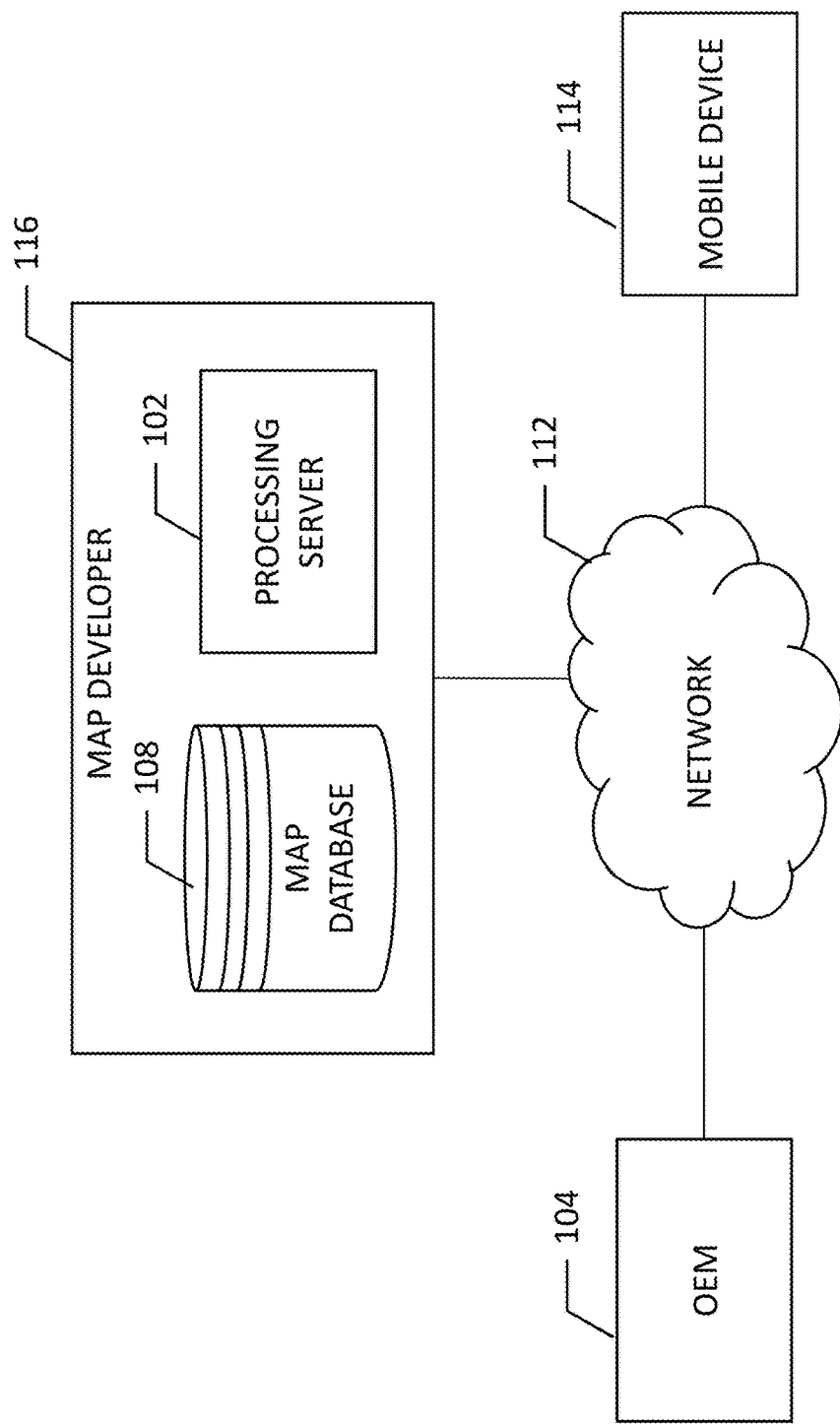
Figure 2:
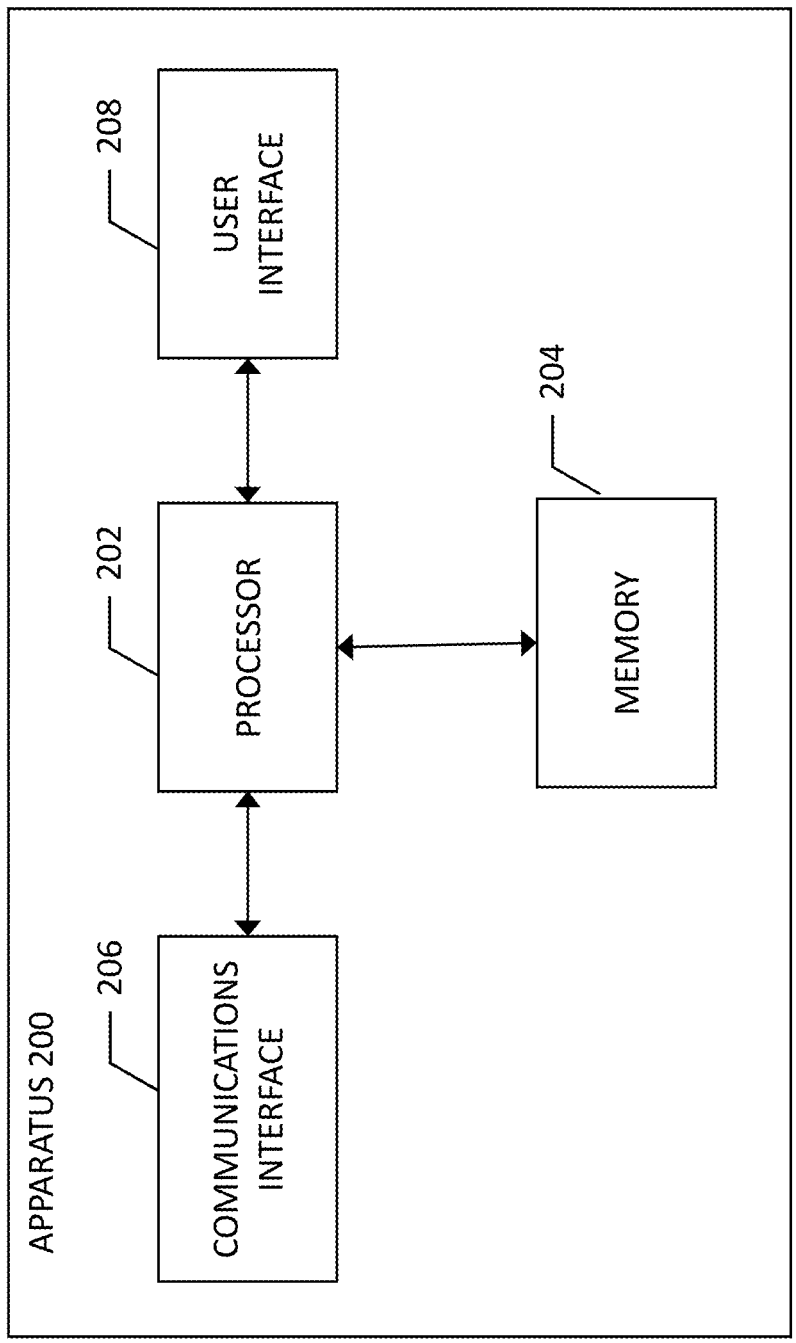
Figure 3A:
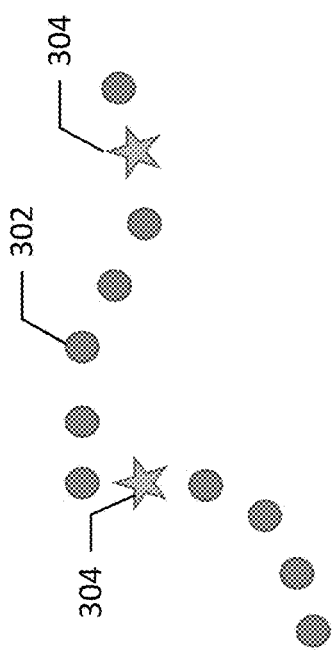
Figure 3B:
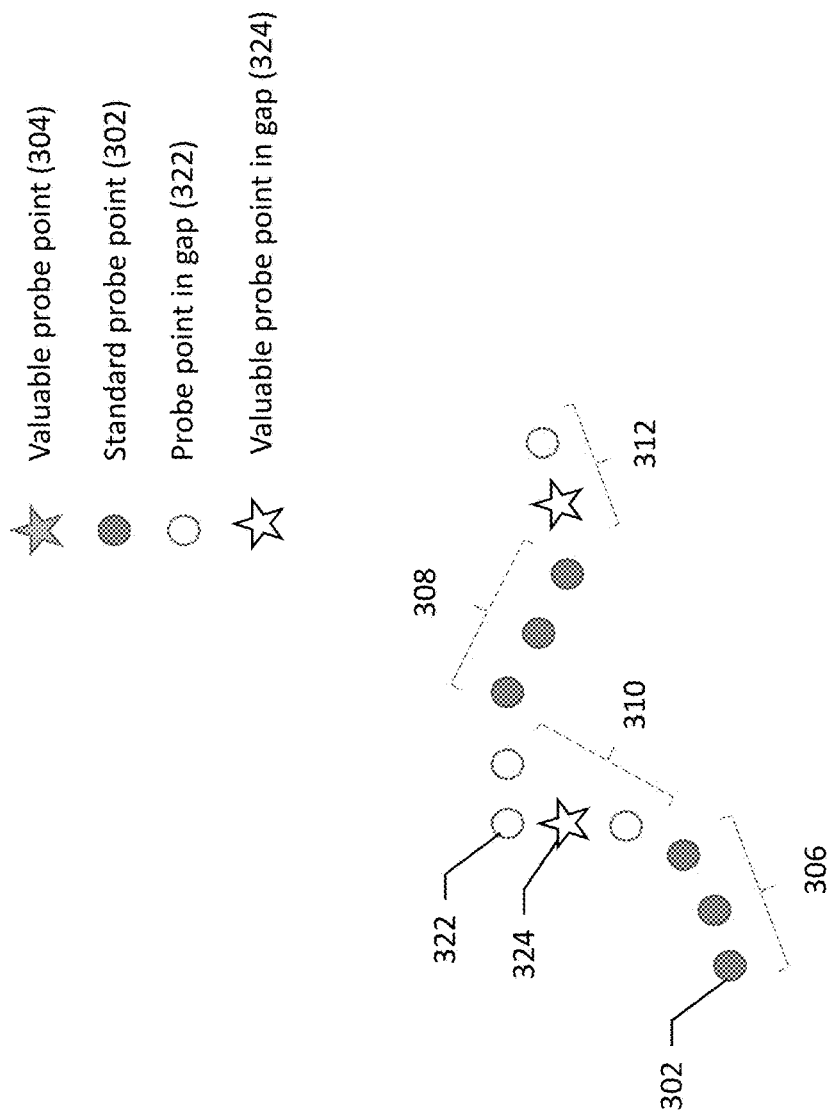
Figure 3C:
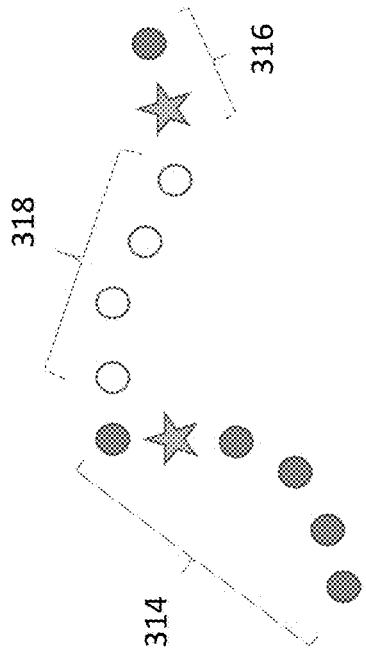
Figure 4:
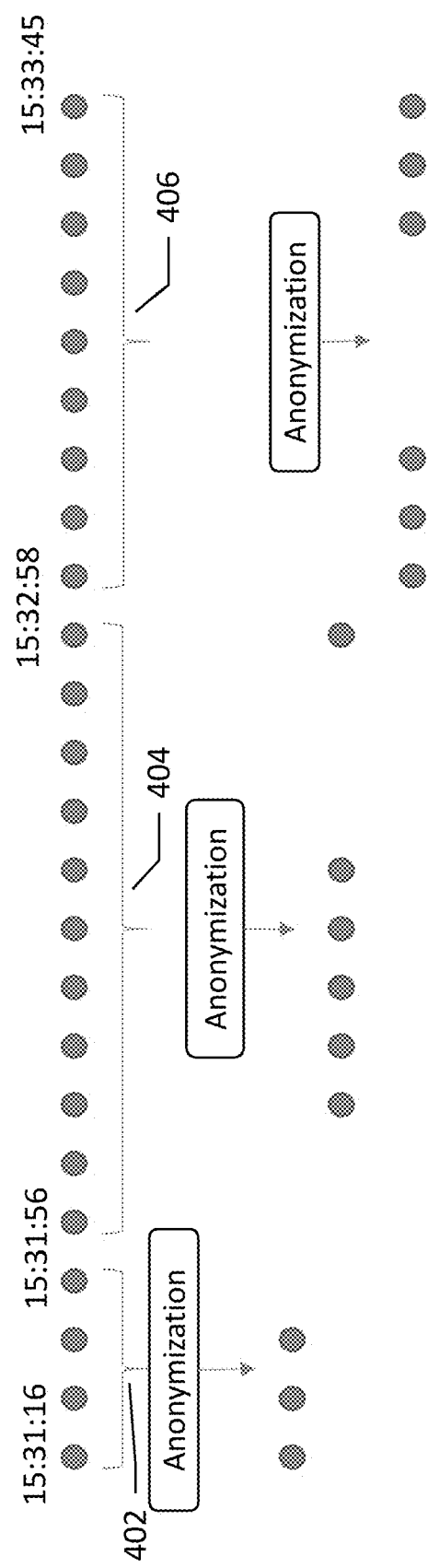
Figure 5A:
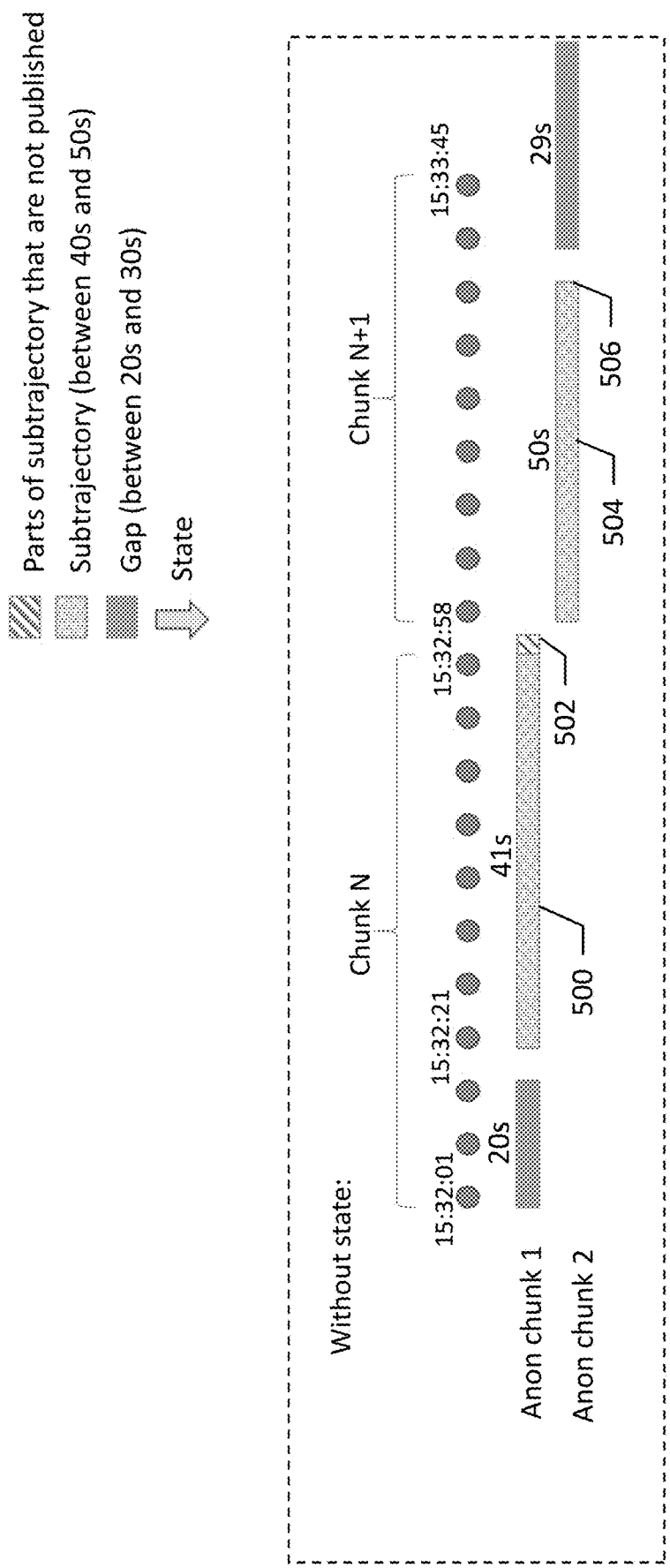
Figure 5B:
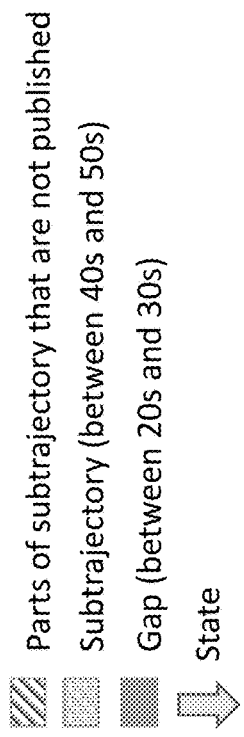
Figure 5B:
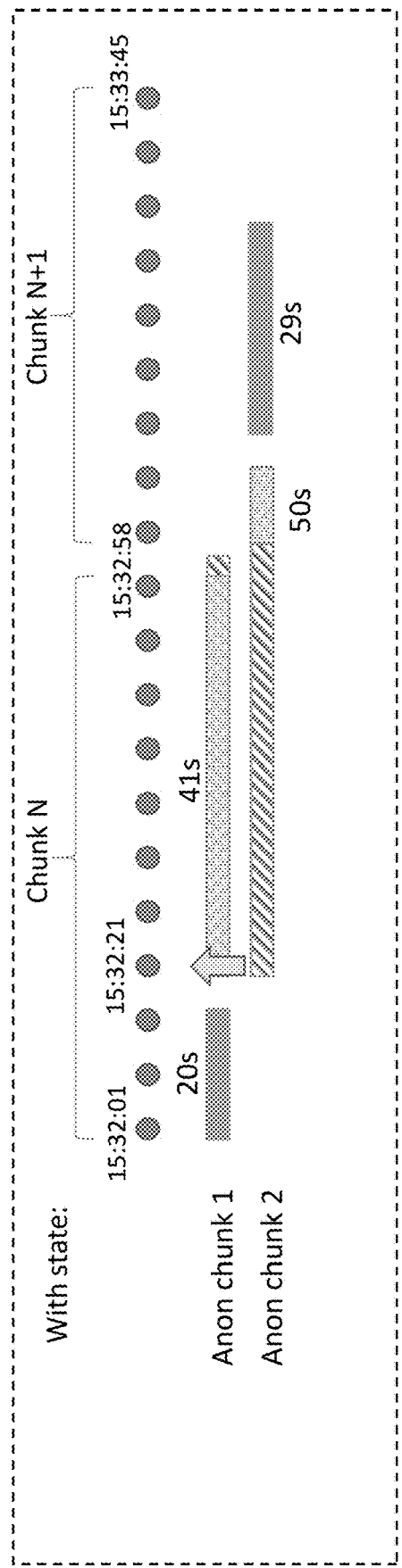
Figure 6A:
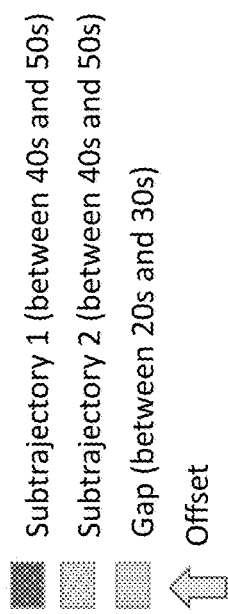
Figure 6A:
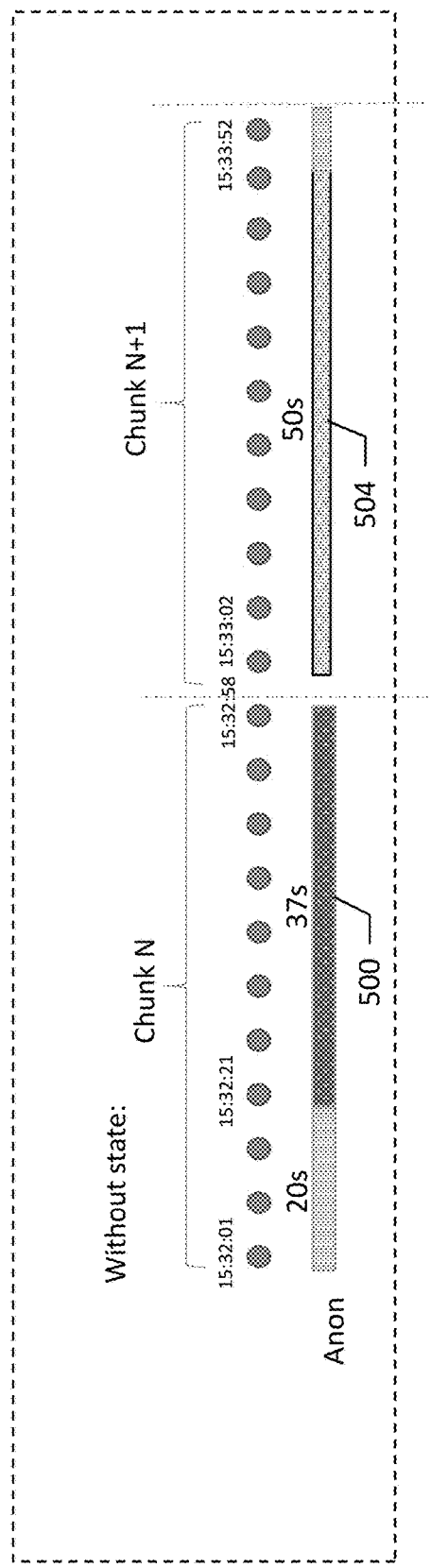
Figure 6B:
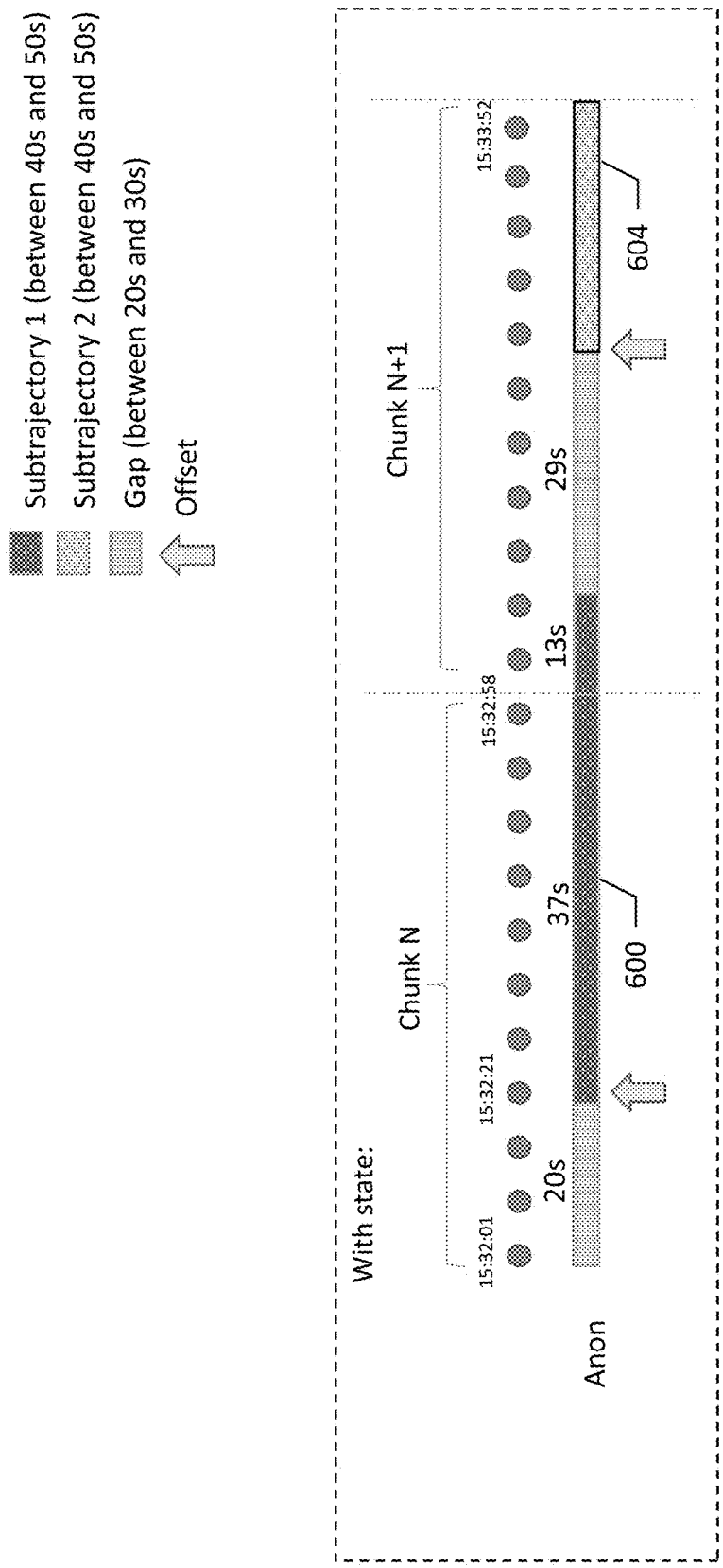
Figure 7:
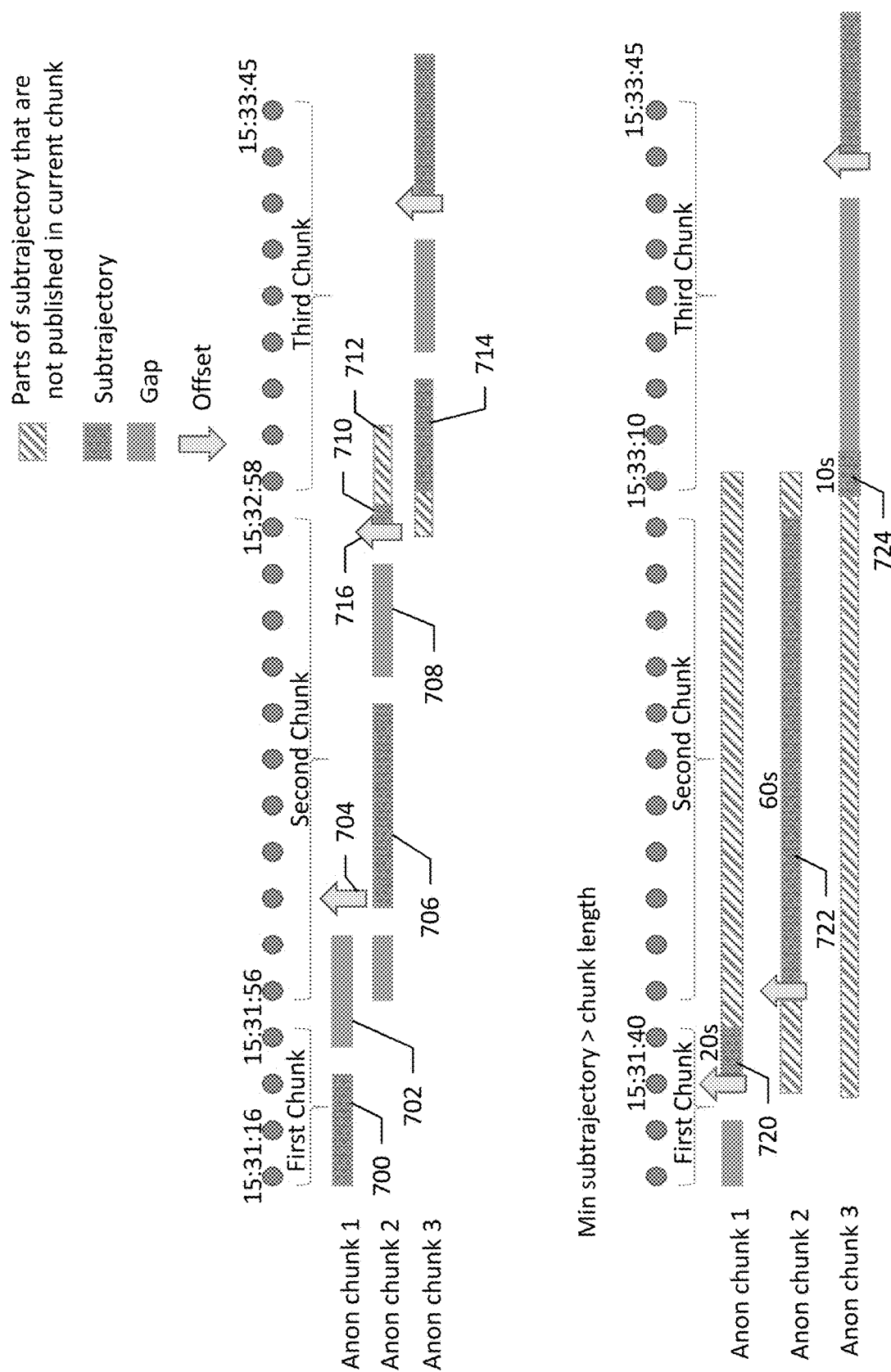
Figure 8:
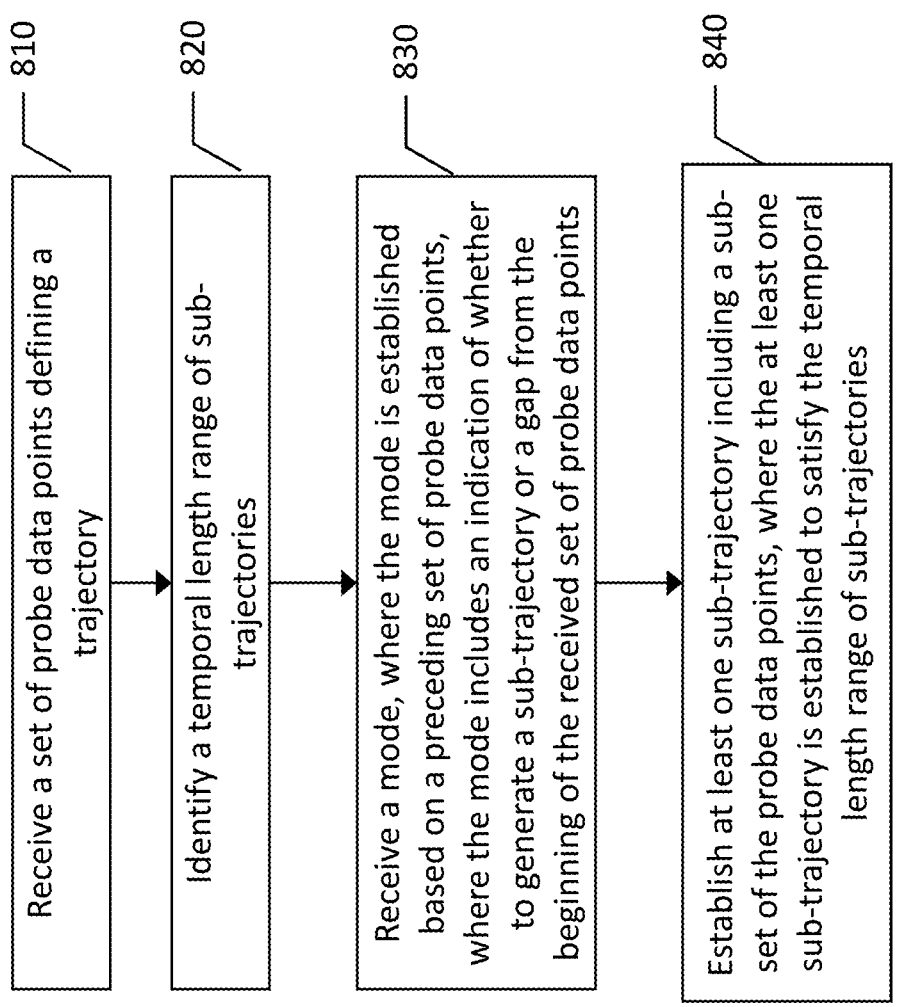

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymizing trajectories generated from probe data in accordance with an example embodiment of the present invention;

FIGS. 3A-3C illustrate a trajectory and two methods of anonymizing the trajectory according to an example embodiment of the present disclosure;

FIG. 4 illustrates an example embodiment in which chunks of probe data are received and anonymized according to an example embodiment of the present disclosure;

FIGS. 5A-5B illustrates the processing of probe data into a sub-trajectory including a sub-trajectory extending between two chunks of probe data according to an example embodiment of the present disclosure;

FIGS. 6A-6B illustrates the processing of probe data into a sub-trajectory including a sub-trajectory extending between two chunks of probe data according to another example embodiment of the present disclosure;

FIG. 7 illustrates the processing of probe data into a sub-trajectory including a sub-trajectory extending between two or more chunks of probe data according to an example embodiment of the present disclosure; and FIG. 8 is a flowchart of a method for anonymizing trajectory data to include higher-utility probe data points in sub-trajectories according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobility data may be defined as a set of points or probe data points, each of which includes at least a latitude, longitude, and timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories can be partitioned in a set of trajectories (trajectory data), each of which identifies the movement of a user over time A single trajectory might 'observe' events as it passes through a specific location in the road network and record data about the event. Some observations may have a higher utility than others, and the location based service provider may seek to maximize the utility of anonymized data.

An additional constraint is that anonymization must be performed in almost-real-time (e.g., anonymized data must be released with a short delay). For this to happen, anonymization algorithms must decide which data points to drop and which ones to keep within a given maximum delay. Anonymizing of location and trajectory data may be performed through application of privacy-enhancing algorithms on the data. Such algorithms may include splitting and gapping of trajectories to subdivide trajectories into a number of shorter sub-trajectories that are pseudonymized and separated by gaps, where data from the original trajectory is dropped. Anonymization may include the placement of these gaps. Selection of these gaps in real-time or near-real-time is challenging. The selection of the gap must be performed as soon as the data point is available for real-time anonymization which means processing each probe data point individually. If the delay is larger (e.g., one-minute or 'near-real-time'), the anonymization can be performed on chunks of data of one-minute lengths. In this case, the anonymized version of the data in a chunk is released as soon as the chunk ends (e.g., every one minute). However, for some use cases, some locations have a higher value or utility than others. Areas where events are frequent or observed, such as major intersections where accident events may occur. Thus, identifying gaps of probe data to drop without concern for location value and utility may result in lower quality data for location based services, and lower customer satisfaction with the location based service they receive.

A method, apparatus, and computer program product are provided herein in accordance with an example embodiment for anonymizing trajectories of mobile devices, and more particularly, to segmenting a trajectory and introducing gaps between the trajectory segments based on tailored use cases to retain portions of the trajectory that have higher utility. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which location information and more specifically, trajectory information can be gathered and shared in a manner that anonymizes the source of the information and makes unmasking of the source difficult. Embodiments provided herein segment and gap a trajectory using an algorithm tailored to use cases where certain parts of a trajectory are associated to a higher utility, and therefore should be retained in the anonymized data. Embodiments work within constraints in the length of sub-trajectories or segments and the gaps therebetween provided as two ranges, and determines the actual size of the sub-trajectories and gaps to offer greater utility. Embodiments can anonymize both off-line (e.g., working with full trajectories) and on-line (e.g., working with trajectory chunks). The on-line variant reads the trajectory data in near real-time and anonymizes the trajectory in "chunks" of a given length (e.g., 1 minute). This means that the delay of any probe point, from its reception to the decision of whether to disclose it or not, will always be at most the chunk size (plus any delay due to processing and transmission). Embodiments thereby render it difficult to establish to whom the trajectory belongs while obtaining useful location-based trajectory information for use with location-based services.

To provide an improved manner of anonymizing trajectories, a system as illustrated in FIG. 1 may be used. FIG. 1 illustrates a communication diagram of an example embodiment of a system for implementing example embodiments described herein. The illustrated embodiment of FIG. 1 includes a map developer system 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike, watercraft travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for anonymizing trajectories of mobile devices, and more particularly, to segmenting a trajectory and introducing gaps between the trajectory segments or sub-trajectories based on tailored use cases to retain portions of the trajectory that have higher utility. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein provide privacy to users of location-based services by adding uncertainty regarding the trajectory from origin to destination of the user. An origin, destination, separately or as a pair, and even portions of a trajectory not including the origin or destination, can reveal sensitive locations regarding the user that generated the trajectory data, such as a home location and/or a work location, a path there between, route preferences, tendencies, or the like. Further, identification of an origin, a destination, or both, may render the identity of the individual user relatively easy to obtain.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. Embodiments described herein mitigate this issue by segmenting a trajectory and introducing gaps between the trajectory segments or sub-trajectories based on tailored use cases to retain portions of the trajectory that have higher utility in order to introduce uncertainty about the actual origin and destination of the trajectory while maintaining the usefulness of the trajectory information. To maximize the utility of the data thereby improving the location-based services provided by the service provider, embodiments described herein identify a portions of a trajectory that have higher utility in terms of providing location based services to improve the location based services received by a user while simultaneously anonymizing their trajectories.

Mobile devices including those carried by users, those associated with vehicles, and any other device type that will track location, produce and transmit sensor data that reflects what was observed during a trip. Sensor data may be transmitted as a sequence of probe points, where the probe points contain sensor observations related to a specific location in space and time. These mobile devices may also observe events (e.g., semantic objects with information about a specific condition such as rain, presence of a road sign, and vehicle malfunction) during a trip. For events to be used in location-based service solutions, the events need to be matched (approximately, within a time window and/or spatial tolerance) to a specific probe data point.

According to an example embodiment described herein, a fleet of vehicles may transmit their trajectory (e.g., through use of a mobile device 114 carried by or incorporated into the vehicle) in real time, where a probe data point is transmitted as it is measured/collected to an OEM 104. The OEM 104 may anonymize the trajectory data prior to release to a service provider. This anonymization may be due to regulatory requirements, agreed-upon terms of use, or user-preferences, for example. The service that this data enables assigns different values to different probe data points. For example, a service for traffic congestion detection may assign more value to probe data points that are in locations where few data points are available. Or an accident detection service may assign more value to probe data in regions where accidents are statistically more likely to occur. A road sign detection service may assign more value to probe data that has observed road signs. For these services, it may be important to keep as many of these probe data points as possible. At the same time, it is important to maintain privacy of the trajectories.

FIG. 3A illustrates a trajectory including standard probe points 302 and valuable probe points 304, where standard probe points have a level of utility below a predetermined value, while valuable probe points 304 have a level of utility above a predetermined value. The level of utility may be based on a variety of factors as further described below; however, valuable probe points 304 relate to locations that are of greater use and value to location-based services and location-based service providers than standard probe points. FIG. 3B illustrates a conventional anonymization of a trajectory where the trajectory is segmented and gapped, whereby first sub-segment 306 and second sub-segment 308 are identified by an algorithm, and first gap 310 and second gap 312 are also identified by the algorithm. As shown, valuable probe points 304 of the original trajectory are lost (shown as 324) as they are discarded from the anonymized trajectory since they are included in the gaps 310 and 312 along with discarded probe points 322 of a typical value or relatively low value as compared to high value probe points 324. FIG. 3C illustrates anonymization of a trajectory according to example embodiments described herein, where valuable probe points 304 of the original trajectory are maintained in the anonymized trajectory due to inclusion of a valuable probe point 304 in sub-segment 314 and in sub-segment 316. The gap 318 is specifically identified to exclude the valuable probe points 304 to avoid loss of high-value, high-utility probe points from the anonymized trajectory.

Values associated with probe data points can be dynamically changed based on context and a changing environment. For example, a warning service that needs to identify both when an accident happens and when a road is cleared. Accidents can be identified from sensors in vehicles traveling along a road, either by the vehicle involved in the accident, or from vehicles or mobile devices having identified another vehicle as having been involved in an accident. The negative event "road is clear" is an indication of a return to normality along the road. In order for a vehicle or mobile device to report a return to normality for the road, vehicles should be made aware to expect an accident at a specific location. To this end, embodiments of the present disclosure would increase the value of observations/probe data points where the accident has been reported, such that vehicles would continue to report the state of the road in that location, which would allow faster, more efficient realization of when the accident is cleared. The location of the accident would be identified as a location of higher utility and higher value such that embodiments would avoid relegating probe data points from proximate the accident location as portions of a gap in a trajectory.

Embodiments of the present disclosure include algorithms that can employ available data about other trajectories, such as data available to the OEM or to the location-based services provider, to determine, for example, which events have been previously observed by other vehicles and mobile devices. These measures increase privacy and utility in cases where the value of observations from probe data points depends on the number of observations, where a certainty of an event, such as traffic congestion, increases if multiple vehicles report the traffic congestion independently, but rapidly flattens as more observations provide confirmation.

According to an example embodiment, a near real-time scenario may be used where a location-based service has a requirement relating to the freshness of data, where data may need to be processed within e.g. two minutes of its generation. In this scenario, the OEM 104 decides to anonymize the data in chunks of length chunk length seconds (e.g., two minutes minus delta, where delta is the processing time required by the anonymization algorithm and any other overhead). Each stream of data (probe data points forming a trajectory) from a vehicle or mobile device 114 is split into chunks of certain size chunk length for anonymization. The data may be collected into a buffer, which has a capacity of chunk length seconds. Once the buffer is full, the data contained in the buffer is provided to the anonymization algorithm and the buffer is emptied ready to receive the next chunk of probe data points. FIG. 4 illustrates an example embodiment in which chunks 402, 404, and 406 are received and anonymized.

The chunks of example embodiments can be synchronized where chunks of different trajectories from different vehicles and mobile devices start and end simultaneously, such as at the beginning of each minute or every other minute. Chunks could be asynchronous and based on time, where each chunk starts at multiples of the chunk length away from the first probe data point in the trajectory. Chunks can be asynchronous and based on probes, where each chunk starts at the first probe data point after the end of the previous chunk, independent of the distance between this probe point and the last probe point in the previous chunk.

Synchronizing chunks of probe data points can increase privacy as an eavesdropper or adversary could use differences in the times at which anonymized chunks are transmitted (e.g., from one backend to another) to link together sub-trajectories in the anonymized data. For example, if the chunk length is one minute, and one trajectory starts at 00:00:12 with no other trajectory starting at XX:XX:12, the eavesdropper could infer that all chunks starting at XX:XX: 12 (excluding those that start with a gap as the first probe data point will be delayed) belong to the same trajectory.

Once the anonymized data for a chunk is published, the anonymization of this data cannot be changed. This constrains the agency of the anonymization algorithm in the current chunk only. The anonymization algorithm can use the information about the current chunk to decide where to place sub-trajectories and gaps. In such a scenario, it may be important to keep track of the state of the trajectory in the previous chunk, which should constrain the mode (e.g., gap or sub-trajectory), the offset (e.g. the time when the mode started), and the last sub-trajectory identified that has been used. The state thus identifies whether the prior chunk ended during a gap or a sub-trajectory, and identifies when that gap or sub-trajectory started. Without this state information, it would not be possible to satisfy the conditions about sub-trajectory and gap sizes.

The state is useful to keep constraints regarding length of the sub-trajectories and gaps across chunks. For example, as shown in FIGS. 5A and 5B, where sub-trajectories are established to be between 40 seconds and 50 seconds long and gaps between 20 seconds and 30 seconds long. A sub-trajectory 500 that starts at second 21 will not finish within one chunk (the chunk has length of 60 seconds and the sub trajectory must have at least 40 seconds of length, so the Chunk N ends 37 seconds into the sub-trajectory 500 and the sub-trajectory ends at 61 seconds, beyond the end of Chunk N shown at 502 in FIG. 5A. With state not considered, the anonymization of the next chunk, Chunk N+1 of FIG. 5A, might determine a sub-trajectory 504 that starts at zero seconds in the next chunk, and ends at 50 seconds 506. Therefore, two sub-trajectories 500 and 504 will not be separated by a gap, leading to releasing consecutive probe data points for a total length of 37 second plus 50 seconds, or 87 seconds.

The absence of a gap between two sub-trajectories renders it easier for the two sub-trajectories to be associated with one another. Keeping an offset, or the time where the mode or last gap/sub-trajectory started, enables determination of the correct length of the sub-trajectory in the second chunk as 50 seconds (the desired length) minus 37 seconds (the current length) to equal 13 seconds as shown in FIG. 5B. Keeping also the sub-trajectory identifier enables assignment of the points in the second chunk the same identifier as the points in the first chunk, hence leading to a sub-trajectory of length 50 seconds versus two trajectories of 37 seconds and 13 seconds, respectively. FIGS. 6A and 6B illustrate the resultant sub-trajectories both with and without the use of the state identifying the mode (gap or sub-trajectory), the offset (the time when the respective mode started), and the last sub-trajectory identifier used. As shown, without the use of state shown in FIG. 6A, sub-trajectories 500 and 504 exist and are substantially adjacent using consecutive probe data points. While sub-trajectories 600 and 604 in FIG. 6B, despite being broken over two chunks (Chunk N and Chunk N+1), satisfy sub-trajectory length requirements and gap requirements while avoiding adjacent sub-segments.

The value in the offset could identify a probe point before or after the beginning of the chunk. A positive value (e.g., a point after the beginning of the chunk) means that the last chunk ended with a gap, such that the first sub-trajectory of the current chunk should start with a delay equal to the extent of the gap in the current chunk. A negative value (e.g., a point before the beginning of the chunk) means that the last chunk ended with a sub-trajectory, such that the first sub-trajectory in the current chunk should be shortened by an amount equal to the extent of the sub-trajectory in the last chunk to have the last sub-trajectory satisfy the sub-trajectory length requirement. Optionally, the offset may always be negative, identifying a point in the preceding chunk that is the start of either a gap or a sub-trajectory. The state is then used to establish whether the preceding chunk ended with a gap or a sub-trajectory.

FIG. 7 illustrates embodiments described herein where a first chunk includes a sub-trajectory 700 and a gap 702. The first chunk ends during the gap, so the offset 704 is in the following chunk. At the offset, 704, the next sub-trajectory 706 begins and extends its duration while remaining within the second chunk. A next gap 708 follows the sub-trajectory 706 and a next sub-trajectory 710 begins within the second chunk. This sub-trajectory 710 extends beyond the second chunk, such that portion 712 of the sub-trajectory is not captured in the second chunk. Conversely, using the offset of example embodiments described herein, the sub-trajectory 710 is continued into the third chunk as sub-trajectory 714 based on the offset 716 in the second chunk.

FIG. 7 also illustrates an example embodiment of an implementation of the present disclosure with respect to minimum sub-trajectory lengths that are longer than the probe data chunk length. In the illustrated embodiment, the minimum sub-trajectory length is 90 seconds, while the chunk lengths are 60 seconds. As shown, a first sub-trajectory portion 720 of 20 seconds is within a first chunk, while a second sub-trajectory portion 722 of 60 seconds is in a second chunk, and the third sub-trajectory portion 724 of 10 seconds is found in the third chunk. Embodiments described herein using the offset to establish that the second chunk and the third chunk begin with sub-trajectories continuing from prior chunks, and as the state includes the sub-trajectory identifier, the three sub-trajectory portions 720, 722, and 724, can be combined as a complete sub-trajectory of 90 seconds.

Example embodiments provided herein include an algorithm for anonymizing trajectories of mobile devices, and more particularly, to segmenting a trajectory and introducing gaps between the trajectory segments or sub-trajectories based on tailored use cases to retain portions of the trajectory that have higher utility. As input to the anonymization algorithm, trajectory data is received that includes a set of probe data points $R=[p_1 \ldots p_n]$ and a trajectory identifier associated with the probe data points. A probe data point $p_i$ includes a location (e.g., latitude and longitude) along with a timestamp. The probe data point may further include a utility factor $U_i$ associated with the respective probe data point for a specific use case. For example, the utility factor may reflect the number and/or type of events observed. Utility factor is used by the anonymization algorithm to decide what probe points to keep (e.g., probe points 304 of FIGS. 3A-3C). Most probe points are unlikely to have substantial utility, such that it is assumed that most probe data points have a utility factor of zero, with few having a positive utility factor.

The utility of probe data points may be established based on the context of a probe data point, a number of events observed at the data point, or a type of event observed at a data point, or a combination thereof. For example, a type of event may include a heavy-braking event indicating a substantial slow-down in traffic. A probe data point having such an observation may be of a higher-utility than a probe data point indicating steady-state operation. Probe data points indicating a change in weather, environmental conditions, road conditions, or any unexpected change may be afforded a higher-utility based on the observations at the probe data point providing useful information to location-based service providers. The utility of probe data points may also be relative. For example, routine heavy traffic on the busiest of highways near a city center may not be remarkable, such that a heavy braking event may not be of such a high utility relative to a probe data point indicating a traction control event indicative of an icy or otherwise slippery road condition. Thus, the utility of probe data points may be relative to probe data points within the total trajectory of the vehicle/mobile device or within a geographic area in the vicinity of the probe data point location.

The utility factor may be established using data gathered by a vehicle or mobile device as it traverses a path and generates probe data points. However, the utility factor may optionally be influenced by the OEM 104 or location-based service provider. For example, an OEM 104 or location-based service provider may not have sufficient probe data in an area to establish or confirm the presence or absence of various objects from the environment, or to confirm the path of a road, for example. The OEM 104 or the location-based service provider may broadcast locations or regions where it is desirable to obtain more information relating to the location. For example, a location may be broadcast to include a radius about a location point, a specific road link or group of road links, a geofence around a region, etc. A vehicle traveling through a region that is identified by an OEM or location-based service provider to be a region where probe data is of a high utility may generate probe data and identify the utility factor for that probe data based on the indication from the OEM or location-based service provider. An example embodiment of such a region where additional data is desired by either an OEM or a location-based service provider may include a road segment where road signs appeared to be detected by previously received data; however, the data may not be sufficient to confirm the presence of the road signs or the content thereof. The road segment may be identified by the OEM or location-based service provider as a high-utility area, where probe data gathered along the road segment may be given a high utility value regardless of the data gathered by the vehicle. Once sufficient probe data from that road segment has been collected to confirm the presence/content of road signs or confirm absence thereof, the utility of that road segment may return to normal and probe data from that road segment no longer given a higher utility based on location alone.

According to an example embodiment, the utility of probe data may be informed by both the vehicle or mobile device collecting the probe data, and by a server receiving the probe data. According to the above-described embodiment in which location influences the utility of the probe data, the location for which more data is needed may be stored by the OEM 104 or map developer, and probe data received from that area may be given a greater utility value than reported from the vehicle or mobile device since it pertains to a region in which more data is needed by an OEM or location-based service provider.

Some geographic regions may consistently require more probe data where these areas may be pre-defined in a map database such that road links within this area may include a higher utility value attributed to them. These geographic regions may be areas where incidents and traffic events are likely to occur such that a high-density of probe data points is desirable. Probe data from these areas may have a high utility factor based on the location which may be supplemented with any events experienced or observed by the mobile device or vehicle traversing the area.

The gap constraints of the algorithm $P_G=(g_{min}, g_{max})$ and sub-trajectory constraints $P_S=(s_{min}, s_{max})$ are used to determine the minimum and maximum lengths of the gaps and of the sub-trajectories, respectively. Input constraints $C_S$ and $C_e$ (timestamp) indicate whether the vehicle or mobile device can send a full trajectory or send chunks of the trajectory in sequence. In the first case where the full trajectory may be sent, $C_S$ and $C_e$ identify the time at which the trajectory starts and ends, respectively. In the second case where chunks of the trajectory are sent, $C_S$ and $C_e$ identify the time at which the current chunk of the trajectory starts and ends, respectively. In the case of sending chunks of the trajectory, multiple chunks will have the same (approximately) size chunk length. The mode, which may be optional, determines if the algorithm should produce a gap or a sub-trajectory, with the default value being sub-trajectory. Optionally, a sub-trajectory identifier pseudo trajectory ID may be provided indicating the sub-trajectory identifier of the most recent sub-trajectory of the probe data. If this identifier is not provided, a new random identifier is generated. Optionally, an offset O is used by the algorithm that identifies the time where the mode (e.g., the last gap or sub-trajectory) started. This defaults to the time of the first probe point on the input.

The sub-trajectory constraints and gap constraints may be used to improve the flexibility with which sub-trajectories are established. Providing a temporal length range for the sub-trajectories and the gaps enables sub-trajectories to be established to capture higher-utility probe data points and to not allow the higher-weight probe data points to fall into a gap between sub-trajectories. In some circumstances, particularly when there are a cluster of higher-utility probe data points, a higher-utility probe data point may fall into a gap as the temporal constraints may not allow all higher-weight probe data points to be captured in sub-trajectories. However, higher-utility probe data points are often not clustered such that a scenario in which a higher-utility probe data point cannot be included in a sub-trajectory due to the sub-trajectory and gap constraints is of a low likelihood. The algorithm of example embodiments conditions the placement of gaps on the utility of the observations associated with specific probe data points of the trajectory, as well as the provided constraints on the size of gaps and sub-trajectories.

The anonymization algorithm of example embodiments outputs one or more anonymized trajectories $A=[p_i, p_{i+1}, \ldots, p_{i+j}]$ where $1<=i<i+j<=n$ which contain a subset of the points in R. The anonymized data contains a sequence of alternating sub-trajectories and gaps, which include consecutive probe data points. The anonymization algorithm determines the set of anonymized sub-trajectories based on the constraints $P_G$ and $P_S$ and the values associated to probe points $p_i$: the value of points in the sub-trajectory is added to the chunk, while points contained in the gap do not increase the value.

According to an example embodiment described herein, a helper function is defined to return index of the optimal end of the current mode (either sub-trajectory or gap):

```
find_optimal_end_of_state (min_expected_time, max_expected_time, mode):
   1. Find a point L₁ that corresponds to min_expected_time.
   2. Find a point L₂ that corresponds to max_expected_time.
      • L₁ and L₂ can be found either as closest (in time) to
        min_expected_time/max_expected_time, or as first candidates to satisfy
        conditions on sub-trajectory (gap) sizes (if strict condition on sub-
        trajectory (gap) size is required).
   3. u_max = the sum of utilities of all points in range (L₁; L₂].
   4. If u_max > 0
      ○ If mode = "sub-trajectory" -> return the index of the last element in
        the trajectory that is before L₂ and has U>0.
      ○ If mode = "gap" -> return index of the first probe after L₁ that has U>0
   5. If u_max = 0 -> return random the index from the interval between points L₁ and L₂
```

The anonymization algorithm may be defined as:
Read:
mode, whether to produce a sub-trajectory or a gap. If the state is not provided, default to 'sub-trajectory'.
O: the time where the mode, i.e. the last gap or sub-trajectory started. If the state is not provided, set it to the time of $p_1$
pseudo trajectory id: the ID of the last-created sub-trajectory. If the state is not provided, set it to a random ID
Set:
progress=1: the index of the probe point in R up to where the anonymization of the data has got and where to continue anonymizing it.
$p_s = 1$
While progress <n:

```
1. Calculate timestamp that corresponds to min required sub-trajectory (gap) length:
       min_expected_time = O + s_min (min_expected_time = O + g_min)
2. Calculate timestamp that corresponds to max required sub-trajectory (gap) length:
       max_expected_time = O + s_max (max_expected_time = O + g_max)
3. If max_expected_time > C_E
       If mode = 'sub-trajectory' # delay decision to next chunk
           progress = n + 1
       else # keep the shortest gap possible, unless it ends in the next chunk
           progress = min(min_expected_time, n+1)
   else:
       If min_expected_time< C_S(meaning that in the previous chunk the decision
       was delayed):
           Beginning = p₁.timestamp
       Else:
           Beginning = min_expected_time
       progress = find_optimal_end_of_state (beginning, max_expected_time,
       mode)
4. if mode='sub-trajectory' -
   if O in [C_s, C_e]:
       generate new pseudo_trajectory_id
   publish sub-trajectory [p_s; ...; p_min(n,progress)] with pseudo_trajectory_id
5. if progress <= n: ##Update state
       p_s=p_progress, O=p_s.timestamp
       invert mode
return: mode, O, pseudo_trajectory_id
```

Embodiments described herein improve the utility of anonymized data by capturing more probe data points that have higher utility than arbitrary split and gap algorithms that ignore the importance of useful probe data points. Embodiments work off-line and in near real-time with chunks of any temporal length. Embodiments support constraints on gap and sub-trajectory sizes even when they are larger than the maximum chunk length. Anonymization may be done in-vehicle or on the backend (e.g., by map services provider or OEM), where anonymization on the backend allows the algorithm to access more information such as an event map that contains all locations where events have previously been observed. This understanding of context and event location can improve performance with respect to detection of negative events (e.g., roadways clearing of traffic). Embodiments may work independently on every trajectory such that execution can be more efficient through parallel execution.

FIG. 8 illustrates a flowchart depicting methods according to an example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 8 illustrates a method of anonymizing trajectories of mobile devices, and more particularly, to segmenting a trajectory and introducing gaps between the trajectory segments or sub-trajectories based on tailored use cases and to retain portions of the trajectory that have higher utility. In the illustrated embodiment, a set of probe data points defining a trajectory is received at 810. The set of probe data points may be received, for example, by an OEM 104 from a vehicle or mobile device 114. The probe data points may include a location (e.g., latitude and longitude), a time stamp, and an indication of the utility of the probe data point which may include an indication of the observations at the probe data point, for example. A temporal length range of sub-trajectories is identified at 820. This length range provides a minimum and a maximum length of a sub-trajectory for it to be valid. The range exists to enable flexibility in the length of a sub-trajectory to enable high-value probe data points to be included in a sub-trajectory while maintaining anonymity. A mode is received at 830 whereby the mode is established based on a preceding set of probe data points, where the mode includes an indication of whether to generate a sub-trajectory or a gap from the beginning of the received set of probe data points. At least one sub-trajectory is established at 840 including a sub-set of the probe data points, where the at least one sub-trajectory is established to satisfy the temporal length range of sub-trajectories.

In an example embodiment, an apparatus for performing the method of FIG. 8 above may comprise a processor (e.g., the processor 202) configured to perform some or each of the operations (810-840) described above. The processor may, for example, be configured to perform the operations (810-840) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 810-840 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
    receive a set of probe data points defining a trajectory;
    identify a temporal length range of sub-trajectories;
    receive a mode, wherein the mode is established based on a preceding set of probe data points defining a trajectory, wherein the mode comprises an indication of whether to generate a sub-trajectory or a gap from the beginning of the received set of probe data points; and
    establish at least one sub-trajectory comprising a sub-set of the set of probe data points, wherein the at least one sub-trajectory is established to satisfy the temporal length range of sub-trajectories.

2. The apparatus of claim 1, wherein the apparatus is further caused to:
    determine probe data points of the set of probe data points having a higher utility relative to other probe data points of the set of probe data points, wherein causing the apparatus to establish at least one sub-trajectory comprising a sub-set of the set of probe data points comprises causing the apparatus to establish at least one sub-trajectory comprising the sub-set of the set of probe data points including the probe data points having a higher utility relative to the other probe data points of the set of probe data points.

3. The apparatus of claim 2, wherein the apparatus is further caused to:
    identify a temporal length range of gaps between sub-trajectories; and
    establish at least one gap comprising a sub-set of the set of probe data points, wherein the at least one gap is established to not include the probe data points having a higher utility relative to other probe data points of the set of probe data points and to satisfy the temporal length range of gaps.

4. The apparatus of claim 2, wherein each probe data point of the set of probe data points defines a location, a timestamp, and a utility, wherein the utility of a probe data point is based, at least in part, on at least one of a context of the probe data point or a number of events or type of event observed at the probe data point.

5. The apparatus of claim 1, wherein the mode comprises an offset, wherein the offset identifies when a last sub-trajectory or a last gap of the preceding set of probe data points began.

6. The apparatus of claim 5, wherein causing the apparatus to establish at least one sub-trajectory comprising a sub-set of the set of probe data points to satisfy the temporal length range of sub-trajectories comprises causing the apparatus to establish at least one sub-trajectory comprising a sub-set of the set of probe data points to satisfy the temporal length range of sub-trajectories including the offset.

7. The apparatus of claim 6, wherein causing the apparatus to establish at least one sub-trajectory comprising a sub-set of the set of probe data points to satisfy the temporal length range of sub-trajectories including the offset comprises causing the apparatus to identify an end of the at least one sub-trajectory satisfying the temporal length range of sub-trajectories based on an optimization algorithm.

8. The apparatus of claim 1, wherein the mode comprises an offset, wherein the offset indicates a time at which a sub-trajectory ending a preceding set of probe data points began in response to the mode indicating a sub-trajectory, and wherein the offset indicates a time at which a gap ending a preceding set of probe data points began in response to the mode indicating a gap.

9. The apparatus of claim 1, wherein the mode further comprises a sub-trajectory identifier of a sub-trajectory in the preceding set of probe data points defining a trajectory, wherein causing the apparatus to establish at least one sub-trajectory comprising the sub-set of the set of probe data points comprises causing the apparatus to combine the sub-trajectory in the preceding set of probe data points defining a trajectory with the at least one sub-trajectory comprising the sub-set of the set of probe data points to form a combined sub-trajectory satisfying the temporal length range of sub-trajectories and being identified by the sub-trajectory identifier.

10. A computer program product comprising at least one non-transitory computer-readable storage medium having computer-executable program code portions stored therein, the computer-executable program code portions comprising program code instructions configured to:
  receive a set of probe data points defining a trajectory;
  identify a temporal length range of sub-trajectories;
  receive a mode, wherein the mode is established based on a preceding set of probe data points defining a trajectory, wherein the mode comprises an indication of whether to generate a sub-trajectory or a gap from the beginning of the received set of probe data points; and
  establish at least one sub-trajectory comprising a sub-set of the set of probe data points, wherein the at least one sub-trajectory is established to satisfy the temporal length range of sub-trajectories.

11. The computer program product of claim 10, further comprising program code instructions to:
  determine probe data points of the set of probe data points having a higher utility relative to other probe data points of the set of probe data points, wherein the program code instructions to establish at least one sub-trajectory comprising a sub-set of the set of probe data points comprises program code instructions to establish at least one sub-trajectory comprising the sub-set of the set of probe data points including the probe data points having a higher utility relative to the other probe data points of the set of probe data points.

12. The computer program product of claim 11, further comprising program code instructions to:
  identify a temporal length range of gaps between sub-trajectories; and
  establish at least one gap comprising a sub-set of the set of probe data points, wherein the at least one gap is established to not include the probe data points having a higher utility relative to other probe data points of the set of probe data points and to satisfy the temporal length range of gaps.

13. The computer program product of claim 11, wherein each probe data point of the set of probe data points defines a location, a timestamp, and a utility, wherein the utility of a probe data point is based, at least in part, on at least one of a context of the probe data point or a number of events or type of event observed at the probe data point.

14. The computer program product of claim 10, wherein the mode comprises an offset, wherein the offset identifies when a last sub-trajectory or a last gap of the preceding set of probe data points began.

15. The computer program product of claim 14, wherein the program code instructions to establish at least one sub-trajectory comprising a sub-set of the set of probe data points to satisfy the temporal length range of sub-trajectories comprises program code instructions to establish at least one sub-trajectory comprising a sub-set of the set of probe data points to satisfy the temporal length range of sub-trajectories including the offset.

16. The computer program product of claim 15, wherein the program code instructions to establish at least one sub-trajectory comprising a sub-set of the set of probe data points to satisfy the temporal length range of sub-trajectories including the offset comprises program code instructions to identify an end of the at least one sub-trajectory satisfying the temporal length range of sub-trajectories based on an optimization algorithm.

17. The computer program product of claim 10, wherein the mode comprises an offset, wherein the offset indicates a time at which a sub-trajectory ending a preceding set of probe data points began in response to the mode indicating a sub-trajectory, and wherein the offset indicates a time at which a gap ending a preceding set of probe data points began in response to the mode indicating a gap.

18. The computer program product of claim 10, wherein the mode further comprises a sub-trajectory identifier of a sub-trajectory in the preceding set of probe data points defining a trajectory, wherein the program code instructions to establish at least one sub-trajectory comprising the sub-set of the set of probe data points comprises program code instructions to combine the sub-trajectory in the preceding set of probe data points defining a trajectory with the at least one sub-trajectory comprising the sub-set of the set of probe data points to form a combined sub-trajectory satisfying the temporal length range of sub-trajectories and being identified by the sub-trajectory identifier.

19. A method comprising:
  receiving a set of probe data points defining a trajectory;
  identifying a temporal length range of sub-trajectories;
  receiving a mode, wherein the mode is established based on a preceding set of probe data points defining a trajectory, wherein the mode comprises an indication of whether to generate a sub-trajectory or a gap from the beginning of the received set of probe data points; and
  establishing at least one sub-trajectory comprising a sub-set of the set of probe data points, wherein the at least one sub-trajectory is established to satisfy the temporal length range of sub-trajectories.

20. The method of claim 19, wherein the mode comprises an offset, wherein the offset indicates a time at which a sub-trajectory ending a preceding set of probe data points began in response to the mode indicating a sub-trajectory, and wherein the offset indicates a time at which a gap ending a preceding set of probe data points began in response to the mode indicating a gap.

\* \* \* \* \*